US011433783B2

(12) United States Patent
Gruener et al.

(10) Patent No.: US 11,433,783 B2
(45) Date of Patent: Sep. 6, 2022

(54) ADJUSTMENT SYSTEM FOR A SEAT

(71) Applicant: Bayerische Motoren Werke Aktiengesellschaft, Munich (DE)

(72) Inventors: Wolfgang Gruener, Eichenau (DE); Robert Martin, Munich (DE); Victor Orlinskiy, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 414 days.

(21) Appl. No.: 16/788,823

(22) Filed: Feb. 12, 2020

(65) Prior Publication Data

US 2020/0180473 A1 Jun. 11, 2020

Related U.S. Application Data

(63) Continuation of application No. PCT/EP2018/070907, filed on Aug. 1, 2018.

(30) Foreign Application Priority Data

Sep. 7, 2017 (DE) ...................... 10 2017 215 804.2

(51) Int. Cl.
*B60N 2/20* (2006.01)
*B60N 2/02* (2006.01)
*B60N 2/14* (2006.01)

(52) U.S. Cl.
CPC ........... *B60N 2/0232* (2013.01); *B60N 2/146* (2013.01); *B60N 2002/0236* (2013.01)

(58) Field of Classification Search
CPC ........ B60N 2/0232; B60N 2/146; B60N 2/06; B60N 2/10; B60N 2/12; B60N 2/14;
(Continued)

(56) References Cited

U.S. PATENT DOCUMENTS 4,846,529 A * 7/1989 Tulley .................. B60N 2/1835
297/DIG. 10
5,479,867 A * 1/1996 Blevins .................. A47B 49/00
108/22
(Continued)

FOREIGN PATENT DOCUMENTS

DE           100 34 025 A1    1/2002
DE      10 2014 201 633 A1    7/2015
GB           2 124 484 A      2/1984

OTHER PUBLICATIONS

International Search Report (PCT/ISA/210) issued in PCT Application No. PCT/EP2018/070907 dated Oct. 31, 2018 with English translation (five (5) pages).
(Continued)

*Primary Examiner* — Mark R Wendell
(74) *Attorney, Agent, or Firm* — Crowell & Moring LLP

(57) ABSTRACT

An adjustment system for a seat has a first bearing shell for receiving a seat surface and/or a seat backrest, a second bearing shell for connecting to a substructure, a first wedge-shaped adjustment ring, which is rotatably mounted on the first bearing shell, a second wedge-shaped adjustment ring, which is rotatably mounted on the second bearing shell and rotatably mounted on the first adjustment ring, a first drive for rotating the first adjustment ring relative to the second adjustment ring, a second drive for rotating the second adjustment ring relative to the second bearing shell, and a blockade mechanism for electively connecting the first bearing shell and the second bearing shell for conjoint rotation.

14 Claims, 2 Drawing Sheets

(58) Field of Classification Search
CPC ...... B60N 2/16; B60N 2/1605; B60N 2/1695; B60N 2/39; B60N 2002/0236; B60N 2002/0204; B60N 2002/0208; B60N 2002/0212; B60N 2002/0216; B60N 2002/022
USPC ...................................................... 296/65.01
See application file for complete search history.

(56) References Cited

U.S. PATENT DOCUMENTS

| | | | | |
|---|---|---|---|---|
| 6,997,512 B1* | 2/2006 | Yu | ............................ | A47C 3/18 |
| | | | | 297/344.21 |
| 7,093,900 B1* | 8/2006 | Schon | .................... | A47C 9/025 |
| | | | | 297/344.11 |
| 8,167,374 B2* | 5/2012 | Findlay | ................. | A47C 1/0265 |
| | | | | 297/344.21 |
| 8,544,390 B1* | 10/2013 | Bahnsen | ................. | F16B 12/26 |
| | | | | 248/349.1 |
| 8,641,144 B2* | 2/2014 | Davis, Jr. | ................. | A47C 7/72 |
| | | | | 297/344.21 |
| 9,180,792 B2* | 11/2015 | Haller | ....................... | B60N 2/14 |
| 11,208,010 B2* | 12/2021 | Haller | .................... | B60N 2/146 |
| 2002/0023995 A1* | 2/2002 | Yoshida | .................... | B60N 2/14 |
| | | | | 248/349.1 |
| 2016/0332540 A1 | 11/2016 | Martin | | |

OTHER PUBLICATIONS

German-language Written Opinion (PCT/ISA/237) issued in PCT Application No. PCT/EP2018/070907 dated Oct. 31, 2018 (four (4) pages).

German-language Search Report issued in counterpart German Application No. 10 2017 215 804.2 dated Jun. 7, 2018 with partial English translation (15 pages).

* cited by examiner

ADJUSTMENT SYSTEM FOR A SEAT

CROSS REFERENCE TO RELATED APPLICATIONS

This application is a continuation of PCT International Application No. PCT/EP2018/070907, filed Aug. 1, 2018, which claims priority under 35 U.S.C. § 119 from German Patent Application No. 10 2017 215 804.2, filed Sep. 7, 2017, the entire disclosures of which are herein expressly incorporated by reference.

BACKGROUND AND SUMMARY OF THE INVENTION

The present invention relates to an adjustment system for a seat. Furthermore, the invention relates to a seat comprising such an adjustment system. The seat is preferably a vehicle seat. The seat is particularly advantageously a driver's seat of a vehicle.

Adjustment systems for vehicle seats are known from the prior art. Such systems also comprise wedge-shaped adjustment rings which are mounted on one another. Such a system is shown in FIG. 1, for example.

FIG. 1 here shows an adjustment system 1 for a seat 2. The seat 2 comprises a seat surface 5 and a seat backrest 6. The seat surface 5 and the seat backrest 6 are fastened to a first bearing shell 3. The fastening of the seat surface 5 and seat backrest 6 to the first bearing shell 3 is in particular rotationally fixed. A first adjustment ring 8 is rotatably mounted on the first bearing shell 5. A second adjustment ring 9 is rotatably mounted on the first adjustment ring 8. The second adjustment ring 9 in turn is rotatably mounted on a second bearing shell 4. The second bearing shell 4 is fastened to a substructure 7 of the seat 2 in a rotationally fixed manner. The substructure 7 advantageously comprises a longitudinal adjuster for the seat 2 and/or a height adjuster for the seat 2.

The first adjustment ring 8 and the second adjustment ring 9 are wedge-shaped, with the result that relative rotation of the first adjustment ring 8 and second adjustment ring 9 makes it possible to produce an inclination movement about a transverse axis of the seat 2, a rolling movement about a longitudinal axis of the seat 2, and/or a rotational movement about the vertical axis of the seat 2. Three drives are necessary for this purpose, wherein a first drive 10 allows a relative rotation between the first adjustment ring 8 and second adjustment ring 9, a second drive 11 allows a relative rotation between the second adjustment ring 9 and second bearing shell 4, and a third drive 18 allows a relative rotation between the first adjustment ring 8 and first bearing shell 3. In this way, the first adjustment ring 8 and second adjustment ring 9 are adjustable in any desired manner relative to one another and relative to the first bearing shell 3 and the second bearing shell 4. In this way, a rotational movement, rolling movement and/or inclination movement of the seat 2 can be achieved.

In the case of such an arrangement, however, a stable orientation of the seat 2 with respect to the rotation about the vertical axis is required. There is thus required a rotation by the third drive 18 in order to compensate for movements of the first adjustment ring 8 and of the second adjustment ring 9. The synchronization and control of the individual drives 10, 11 and 18 is very demanding especially during cornering and upon movement of an occupant of the vehicle who is seated on the seat 2. The rotation by the third drive 18 is often perceived as disturbing. Occasionally, it can also lead to kinetosis.

It is therefore an object of the invention to provide an adjustment system which, in combination with simple and cost-effective production and assembly, allows a secure, reliable and at the same time simple-to-operate adjustment of a seat.

This and other objects are achieved by an adjustment system for a seat, comprising a first bearing shell, a second bearing shell, a first wedge-shaped adjustment ring and a second wedge-shaped adjustment ring. The first bearing shell is designed for receiving a seat surface and/or a seat backrest. The second bearing shell is designed for fastening the adjustment system to a substructure. The substructure can in particular be a longitudinal adjuster and/or height adjuster for the seat. The substructure is preferably fixed in a rotationally fixed manner. A relative rotation of the first bearing shell and seat surface and/or seat backrest, as equally a relative rotation of the second bearing shell and substructure, is preferably excluded. The first wedge-shaped adjustment ring is rotatably mounted on the first bearing shell. The second adjustment ring is rotatably mounted on the second bearing shell and rotatably mounted on the first adjustment ring.

Furthermore, the adjustment system has a first drive and a second drive. The first drive serves for rotating the first adjustment ring with respect to the second adjustment ring. The second drive serves for rotating the second adjustment ring with respect to the second bearing shell. The drive is particularly advantageously constituted by electric motors which have a pinion which engages in an internal toothing. For example, the electric motor of the first drive can be fixedly coupled to the first adjustment ring and can engage by its pinion into an internal toothing of the second adjustment ring. At the same time, the electric motor of the second drive can be fixedly coupled to the second adjustment ring and can engage in an internal toothing of the second bearing shell. A rolling movement, inclination movement and/or rotary movement of the seat can thus already partially be carried out with the first drive and the second drive. A blockade mechanism is present for the complete control of these movements. The blockade mechanism serves for selectively connecting the first bearing shell and the second bearing shell in a rotationally fixed manner. The rotationally fixed connection avoids having to provide a third drive which compensates for movements of the first adjustment ring and the second adjustment ring. Movements of the adjustment system that are perceived as disturbing are thus eliminated. Rather, the blockade mechanism always ensures that the first bearing shell and second bearing shell cannot be rotated relative to one another if this is desired. It is thus possible in particular to achieve a situation in which a rolling movement and/or inclination movement are/is carried out by relative rotation of the first wedge-shaped adjustment ring and the second wedge-shaped adjustment ring by virtue of only the first adjustment ring and the second adjustment ring being moved, but the first bearing shell and the second bearing shell being connected to one another in a rotationally fixed manner. Consequently, only two drives have to be coordinated, unlike three in the prior art. The actuation of the adjustment system is thus considerably simplified. At the same time, it is ensured that no movements which are disturbing for the user of the seat are produced.

The first adjustment ring and the second adjustment ring each preferably have a first end face and a second end face. Since the adjustment rings are annular elements, a center axis is thus defined. End faces are realized by the center axis and lie in a respective plane which intersects the center axis. A circumferential surface is also realized and is oriented to run around the center axis. The first end face and the second end face are oriented at an angle to one another. In this way, the wedge shape is achieved. There is provision that the first end face of the first adjustment ring and the first end face of the second adjustment ring are always arranged parallel to one another. The first adjustment ring and the second adjustment ring are particularly advantageously mounted on one another at the respective first end faces. The second end face of the first adjustment ring and the second end face of the second adjustment ring are arranged in parallel in at least one relative orientation of the first adjustment ring and second adjustment ring. A relative rotation of the first adjustment ring and second adjustment ring results in a change in the angle between the second end face of the first adjustment ring and the second end face of the second adjustment ring. There thus occurs a tilting of the first bearing shell and second bearing shell. In this way, the above-described rolling movements and inclination movements can be realized. If the first adjustment ring and the second adjustment ring are simultaneously rotated by the same distance such that no relative rotation of the first adjustment ring and second adjustment ring occurs, a rotation of the seat about its vertical axis is made possible.

The blockade mechanism preferably has a cardan shaft. The blockade mechanism also has a connecting element. The cardan shaft is connected to the first bearing shell in a rotationally fixed manner. The cardan shaft can be selectively connected to the second bearing shell in a rotationally fixed manner via the connecting element. It is thus made possible, on the one hand, to carry out a rotation of the seat about its vertical axis. In this case, a rotationally fixed connection of the second bearing shell and the cardan shaft does not occur. It is thus made possible for a user to rotate the seat manually about its vertical axis. For this purpose, only the seat surface and seat backrest have to be rotated relative to the substructure. A driven rotation of the seat is not provided. If the cardan shaft is connected to the second bearing shell in a rotationally fixed manner by the connecting element, no relative rotation of the first bearing shell and second bearing shell is possible. In this case, a rolling movement and/or inclination movement can thus be carried out by the first adjustment ring and the second adjustment ring being rotated relative to one another.

The cardan shaft can preferably also be selectively connected to the second adjustment ring in a rotationally fixed manner by the connecting element. It is thereby made possible to control a rotation of the seat by movement of the second adjustment ring. If the cardan shaft is connected to the second adjustment ring in a rotationally fixed manner, there occurs a rotation of the first bearing shell relative to the second bearing shell if the second adjustment ring is rotated relative to the second bearing shell. If it is ensured at the same time that the first adjustment ring is not rotated with respect to the second adjustment ring, a pure rotational movement of the seat can be carried out by the first bearing shell being rotated relative to the second bearing shell.

An additional connecting element is particularly advantageously present. The additional connecting element serves for selectively connecting the first bearing shell and the first adjustment ring. The first bearing shell and first adjustment ring can preferably be selectively connected in a rotationally fixed manner by the additional connecting element. It is thereby made possible to allow a rotation of the seat about its vertical axis by means of the first drive. For this purpose, the cardan shaft is not connected to the second bearing shell in a rotationally fixed manner via the connecting element. At the same time, the first bearing shell is connected to the first adjustment ring in a rotationally fixed manner via the additional connecting element. Consequently, a rotation of the first adjustment ring can lead to a rotation of the first bearing shell relative to the second bearing shell. At the same time, a rotation of the second adjustment ring, which is realized by the second drive, relative to the second bearing shell and a simultaneous prevention of a relative rotation of the first adjustment ring and second adjustment ring can also lead to a rotation of the first bearing shell relative to the second bearing shell. If, as described above, inclination movements and/or rolling movements are/is intended to be carried out, no rotationally fixed connection between the first bearing shell and first adjustment ring is to be provided by the additional connecting element, while at the same time the cardan shaft is connected to the second bearing shell in a rotationally fixed manner by the connecting element.

The additional connecting element particularly advantageously comprises a coupling element and/or a latching fitting. In this way, a secure and reliable rotationally fixed connection of the first bearing shell and the first adjustment ring can be realized.

Furthermore, there is particularly advantageously provision that the adjustment system has a viscous brake. In a viscous brake, plates are arranged rotatably in a liquid-filled housing. The liquid is a high-viscosity fluid. If a rotation of the plates occurs, shear forces are generated within the high-viscosity fluid. Said rotation is thus braked. The viscous brake is fastened to the second bearing shell in a rotationally fixed manner, which means in particular that a housing is fastened to the second bearing shell in a rotationally fixed manner. Alternatively or additionally, the viscous brake can be fastened to the substructure in a rotationally fixed manner. The cardan shaft can be selectively connected to the viscous brake in a rotationally fixed manner, in particular to the plates of the viscous brake, by the connecting element. If the cardan shaft is connected to the viscous brake in a rotationally fixed manner, a rotation of the seat can be carried out manually. In particular, a relative rotation of the first bearing shell and second bearing shell is made possible, but only against the resistance of the viscous brake. Unintentional rotation is thus avoided.

There is particularly advantageously provision that the connecting element comprises a coupling element and/or a latching fitting. It is thus ensured that there occurs a secure and reliable rotationally fixed connection of the cardan shaft and second bearing shell and/or of the cardan shaft and second adjustment ring and/or of the cardan shaft and viscous brake.

The mounting of the first adjustment ring on the first bearing shell and/or the mounting of the second adjustment ring on the second bearing shell and/or the mounting of the second adjustment ring on the first adjustment ring occur/occurs in particular in each case via a sliding bearing and/or a ball bearing. Such a bearing arrangement ensures that small friction forces occur between the individual elements. A driving of the individual components can thus occur in a secure and reliable manner, with the result that an effective adjustment of the seat, in particular to generate rolling movements and/or inclination movements and/or rotary movements, is made possible.

Finally, the invention encompasses a seat having an adjustment system as described above. The seat is in particular a vehicle seat. The seat is particularly advantageously such a seat of a vehicle that is provided for a driver of the vehicle.

The seat preferably has a longitudinal axis which is oriented in a direction in which a person who is seated on the seat customarily views. At the same time, the seat has a vertical axis which is oriented perpendicular to the longitudinal axis and corresponds to a vertical axis of the person who is seated on the seat. Finally, the seat has a transverse axis which is oriented perpendicularly to the vertical axis and longitudinal axis. What is to be understood by an above-described inclination movement is in particular a tilting of the seat about the transverse axis. In the case of a rolling movement, there particularly occurs a tilting of the seat about the longitudinal axis. In the case of a rotational movement, there occurs a rotation of the seat about the vertical axis.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
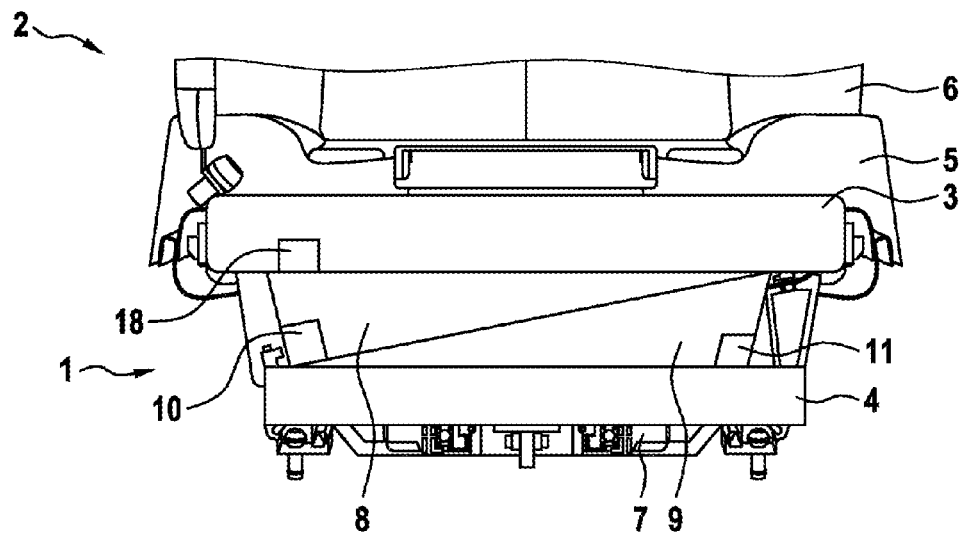
FIG. 1 is a schematic view of a seat having an adjustment system according to the prior art.

FIG. 1 shows a seat 2 having an adjustment system 1 according to the prior art. This has already been described in the background section.

Figure 2:
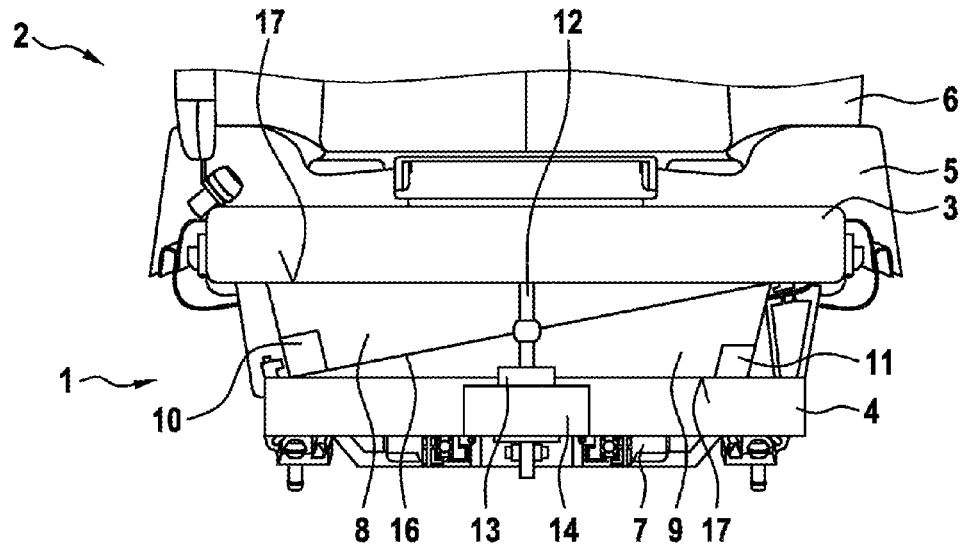
FIG. 2 is a schematic view of a seat having an adjustment system according to a first exemplary embodiment of the invention.

FIG. 2 schematically shows a seat 2 comprising an adjustment system 1 according to a first exemplary embodiment of the invention. The seat 2 comprises a substructure 7 which allows a longitudinal adjustment and/or height adjustment of the seat 2. The substructure 7 is additionally arranged in a rotationally fixed manner. Furthermore, the seat 2 comprises a seat surface 5 and a seat backrest 6 which are provided for contact with a user of the seat 2.

An adjustment of the seat 2 is realized by virtue of the fact that the seat backrest 6 and seat surface 5 are adjusted relative to the substructure 7. For this purpose, a first bearing shell 3, a second bearing shell 4, a first adjustment ring 8 and a second adjustment ring 9 are provided. The first bearing shell 3 is connected to the seat surface 5 and/or the seat backrest 6 in a rotationally fixed manner. The second bearing shell 4 is connected to the substructure 7 in a rotationally fixed manner. The first adjustment ring 8 is rotatably mounted on the first bearing shell 3. The second adjustment ring 9 is rotatably mounted on the second bearing shell 4. In addition, the second adjustment ring 9 is rotatably mounted on the first adjustment ring 8. There can also be provision that the first adjustment ring 8 is rotatably mounted on the second adjustment ring 9.

The first adjustment ring 8 is rotatable relative to the second adjustment ring 9 via a first drive 10. Likewise, the second adjustment ring 9 is rotatable with respect to the second bearing shell 4 via a second drive 11. The first drive 10 and the second drive 11 particularly advantageously comprise an electric motor which engages via a pinion in an internal toothing. Thus, for example, the second adjustment ring 9 has an internal toothing in which there engages a pinion of the electric motor, which is connected fixedly to the first adjustment ring 8, of the first drive 10. Likewise, the second bearing shell 4 preferably has an internal toothing in which there engages a pinion of an electric motor, which is connected fixedly to the second adjustment ring 9, of the second drive 11. In order to produce a rolling movement and/or inclination movement, the first adjustment ring 8 and the second adjustment ring 9 are wedge-shaped. This means that a first end face 16 and a second end face 17 of the first adjustment ring 8 and the second adjustment ring 9 are oriented at an angle to one another. Furthermore, there is provision that the first end faces 16 of the first adjustment ring 8 and the second adjustment ring 9 are always arranged parallel to one another. In particular, the first adjustment ring 8 and second adjustment ring 9 are mounted on one another via the respective first end faces 16. There is thus preferably present at least one orientation of the first adjustment ring 8 and second adjustment ring 9 relative to one another in which the second end face 17 of the first adjustment ring 8 and the second end face 17 of the second adjustment ring 9 are arranged parallel to one another. A relative rotation of the first adjustment ring 8 and of the second adjustment ring 9 results in a change in the angle between the second end faces 17 of the first adjustment ring 8 and second adjustment ring 9. In this way, the first bearing shell 3 and the second bearing shell 4 can be tilted relative to one another in order to carry out said rolling movements and/or inclination movements.

To ensure that the seat 2 maintains an orientation about the vertical axis during the rotation of the first adjustment ring 8 and second adjustment ring 9, a blockade mechanism having a cardan shaft 12 and a connecting element 13 is present. The cardan shaft 12 is connected to the first bearing shell 3 in a rotationally fixed manner. The cardan shaft 12 can be selectively connected to the second bearing shell 4 in a rotationally fixed manner via the connecting element 13.

If the cardan shaft 12 is connected to the second bearing shell 4 in a rotationally fixed manner via the connecting element 13, there does not occur a relative rotation of the first bearing shell 3 and second bearing shell 4. If a rotation of the first adjustment ring 8 and second adjustment ring 9 is set via the first drive 10 and via the second drive 11, there occurs only a tilting of the first bearing shell 3 and second bearing shell 4 relative to one another. A compensating movement by a third drive 18 as in the prior art is not necessary. Rolling movements and/or inclination movements are thus carried out for a user of the seat 2 without disturbing drives.

In the first exemplary embodiment, there is additionally present a viscous brake 14. If the cardan shaft 12 is not connected to the second bearing shell 4 in a rotationally fixed manner, the cardan shaft 12 is connected to the viscous brake 14 in a rotationally fixed manner by the connecting element 13. The connecting element 13 is thus advantageously a coupling which can change between a rotationally fixed connection of the cardan shaft 12 and second bearing shell 4 and a rotationally fixed connection between the cardan shaft 12 and viscous brake 14.

If the cardan shaft 12 is connected to the viscous brake 14 in a rotationally fixed manner, a manual rotation of the seat 2 about the vertical axis is made possible. This means that a user can rotate the first bearing shell 3 and the second bearing shell 4 relative to one another. Said rotation occurs against the resistance of the viscous brake 14 in order to avoid uncontrolled rotation. A driving of the rotation of the seat 2 is not possible in this case.

In order to allow a driving of the rotation of the seat 2 about the vertical axis, there is particularly advantageously provision that in addition a rotationally fixed connection between the cardan shaft 12 and second adjustment ring 9 can be produced by way of the connecting element 13. Thus, the connecting element 13 can advantageously realize three different connections of the cardan shaft 12: either a rotationally fixed connection to the second bearing shell 4, or a rotationally fixed connection to the viscous brake 14, or a rotationally fixed connection to the second adjustment ring 9.

If the cardan shaft 12 is connected to the second adjustment ring 9 in a rotationally fixed manner via the connecting element 13, a relative rotation of the first bearing shell 3 and second bearing shell 4 can be achieved by rotation of the second adjustment ring 9 relative to the second bearing shell 4. Said rotation can be controlled by the second drive 11. Consequently, a rotation of the seat 2 about the vertical axis can also be actively driven. If only a rotation of the seat 2 is desired, the movement of the second adjustment ring 9 is to be compensated by a rotation, controlled by means of the first drive 10, of the first adjustment ring 8.

Figure 3:
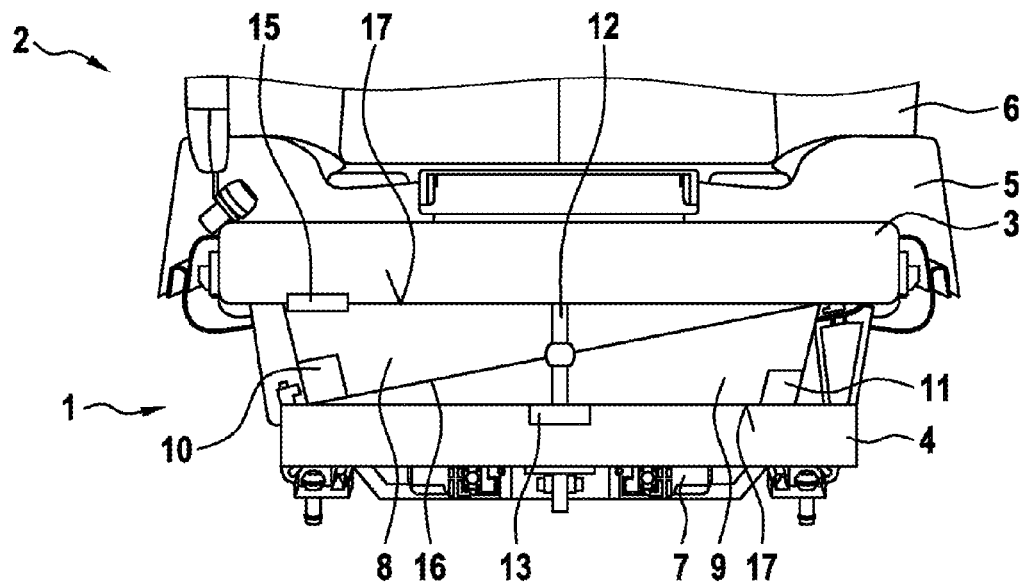
FIG. 3 is a schematic view of a seat having an adjustment system according to a second exemplary embodiment of the invention.

FIG. 3 shows a second exemplary embodiment of the seat 2 having the adjustment system 1. By contrast to the first exemplary embodiment, no viscous brake 14 is present. However, analogously to the first exemplary embodiment, such a viscous brake 14 can also be provided in the second exemplary embodiment. In the second exemplary embodiment, the connecting element 13 is preferably a locking mechanism. There is provision here that the connecting element 13 can be used exclusively to connect the cardan shaft 12 and second bearing shell 4 in a rotationally fixed manner. Should a viscous brake 14 be provided as in the first exemplary embodiment, the connecting element 13 is preferably again a coupling which is provided to selectively connect the cardan shaft 12 and second bearing shell 4 or viscous brake 14.

Furthermore, an additional connecting element 15 is present. The additional connecting element 15 is preferably also a locking element. The locking elements are in particular latching fittings for the rotationally fixed connection of two partners. The first bearing shell 3 can be connected to the first adjustment ring 8 in a rotationally fixed manner by the additional connecting element 15.

If a rolling movement and/or inclination movement are/is intended to be produced, there is provision that the cardan shaft 12 is connected to the second bearing shell 4 in a rotationally fixed manner via the connecting element 13. In this case, a relative rotation of the first bearing shell 3 and second bearing shell 4 is not possible. The first drive 10 and the second drive 11 thus make it possible to adjust the first adjustment ring 8 and the second adjustment ring 9 relative to one another in order to generate rolling movements and/or inclination movements. At the same time, an orientation of the seat 2 about the vertical axis is maintained without an additional drive having to be used. If, however, a rotation of the seat 2 about its vertical axis is intended to occur, the cardan shaft 12 is not connected to the second bearing shell 4 in a rotationally fixed manner via the connecting element 13. On the other hand, there occurs a rotationally fixed connection of the first adjustment ring 8 and the first bearing shell 3 and the additional connecting element 15. Thus, a relative rotation of the first bearing shell 3 and second bearing shell 4 can be produced by a relative rotation of the first adjustment ring 8 with respect to the second bearing shell 4. Said relative rotation of the first adjustment ring 8 and second bearing shell 9 can be achieved in particular by the second drive 11, while at the same time the first drive 10 ensures that the second adjustment ring 9 and the first adjustment ring 8 are not rotated relative to one another. Alternatively, the mixing of rolling movements and/or inclination movements and/or rotational movements of the seat 2 is made possible.

If a rotationally fixed connection is produced neither by the connecting element 13 nor by the additional connecting element 15, a manual rotation of the seat 2 can occur. Thus, an adjustment of the seat 2 by the user is made possible. In this position, no driven rotation of the seat 2 is possible.

Figure 4:
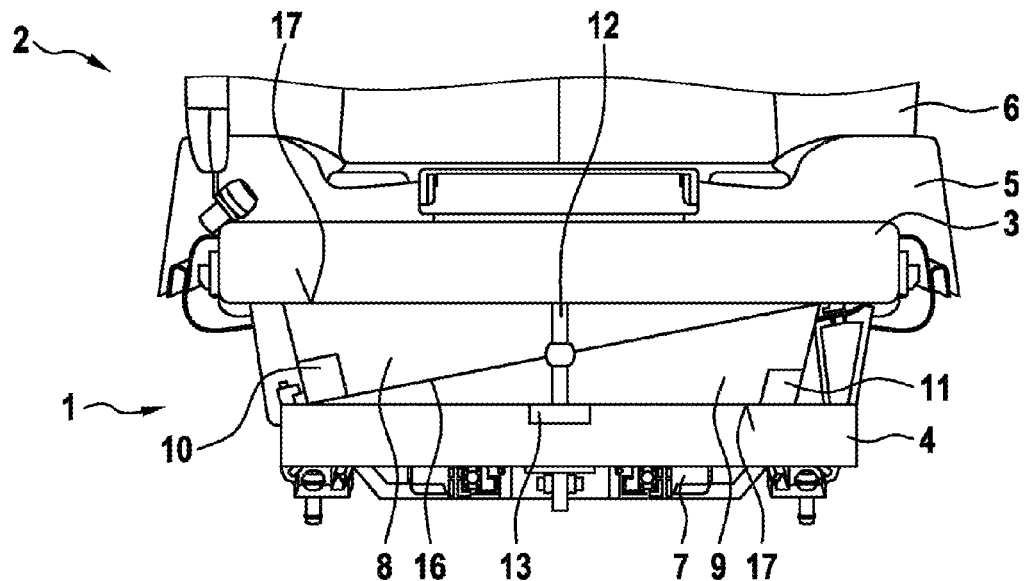
FIG. 4 is a schematic view of a seat having an adjustment system according to a third exemplary embodiment of the invention.

FIG. 4 finally shows a third exemplary embodiment of the invention. In the third exemplary embodiment, by contrast to the second exemplary embodiment, the additional connecting element 15 is dispensed with. Thus, a driving of a rotation of the seat 2 is not possible. A rotationally fixed connection between the cardan shaft 12 and the second bearing shell 4 can preferably be realized only selectively by the connecting element 13. Such a connection is realized if a rolling movement and/or an inclination movement of the seat 2 are/is intended to be carried out. A relative rotation of the first bearing shell 3 and second bearing shell 4 is prevented by the rotationally fixed connection of the cardan shaft 12 and second bearing shell 4. A generation of rolling movements and/or inclination movements occurs as described above.

If no rotationally fixed connection between the cardan shaft 12 and second bearing shell 4 is present by means of the connecting element 13, a rotation of the seat 2 by a user is made possible. A driving of this rotation, that is to say a driving of a rotation between the first bearing shell 3 and second bearing shell 4, is not possible in this case. Rather, such a rotation is to be carried out by the user of the seat 2.

It is evident that the adjustment system 1 in all exemplary embodiments can carry out either a combined production of rolling movements and/or inclination movements and/or rotational movements. Equally, isolated rolling movements or inclination movements or rotational movements can be carried out. It is also made possible that rotational movements are carried out manually and a blockade by the adjustment system 1 does not occur.

In any case, a situation is avoided in which, to carry out rolling movements and/or inclination movements without rotational movements, an additional drive as in the prior art is necessary to compensate for movements of the first adjustment ring and the second adjustment ring. Such a drive would lead to disturbing movements, which can thus be dispensed with.

LIST OF REFERENCE SIGNS

1 adjustment system
2 seat
3 first bearing shell
4 second bearing shell
5 seat surface
6 seat backrest
7 substructure
8 first adjustment ring
9 second adjustment ring
10 first drive
11 second drive
12 cardan shaft 13 connecting element
14 viscous brake
15 additional connecting element
16 first end face
17 second end face
18 third drive The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adjustment system for a seat, comprising:
    a first bearing shell for receiving a seat surface and/or a seat backrest;
    a second bearing shell for attaching to a substructure;
    a first wedge-shaped adjustment ring which is rotatably mounted on the first bearing shell;
    a second wedge-shaped adjustment ring which is rotatably mounted on the second bearing shell and rotatably mounted on the first adjustment ring;
    a first drive for rotating the first adjustment ring with respect to the second adjustment ring;
    a second drive for rotating the second adjusting ring with respect to the second bearing shell, and
    a blockade mechanism for selectively connecting the first bearing shell and the second bearing shell in a rotationally fixed manner.

2. The adjustment system according to claim 1, wherein
    the first adjustment ring and the second adjustment ring each have a first end face and a second end face,
    the first end face is oriented at an angle with respect to the second end face,
    the first end faces of the first adjustment ring and second adjustment ring are always arranged parallel, and
    the second end faces of the first adjustment ring and second adjustment ring are arranged in parallel in at least one relative orientation of the first adjustment ring and second adjustment ring.

3. The adjustment system according to claim 1, wherein
    the blockade mechanism has a cardan shaft and a connecting element, and
    the cardan shaft is connected to the first bearing shell in a rotationally fixed manner and is selectively connectable to the second bearing shell in a rotationally fixed manner via the connecting element.

4. The adjustment system according to claim 3, wherein the cardan shaft is selectively connectable to the second adjustment ring in a rotationally fixed manner by the connecting element.

5. The adjustment system according to claim 4, further comprising:
    an additional connecting element, wherein
    the first bearing shell is selectively connectable to the first adjustment ring in a rotationally fixed manner by the additional connecting element.

6. The adjustment system according to claim 4, further comprising:
    a viscous brake which is fastened to the second bearing shell in a rotationally fixed manner and/or is fastenable to the substructure in a rotationally fixed manner, wherein
    the cardan shaft is selectively connectable to the viscous brake in a rotationally fixed manner by the connecting element.

7. The adjustment system according to claim 3, further comprising:
    an additional connecting element, wherein
    the first bearing shell is selectively connectable to the first adjustment ring in a rotationally fixed manner by the additional connecting element.

8. The adjustment system according to claim 7, wherein the additional connecting element comprises a coupling element and/or a latching fitting.

9. The adjustment system according to claim 7, wherein the connecting element comprises a coupling element and/or a latching fitting.

10. The adjustment system according to claim 3, further comprising:
    a viscous brake which is fastened to the second bearing shell in a rotationally fixed manner and/or is fastenable to the substructure in a rotationally fixed manner, wherein
    the cardan shaft is selectively connectable to the viscous brake in a rotationally fixed manner by the connecting element.

11. The adjustment system according to claim 10, wherein the connecting element comprises a coupling element and/or a latching fitting.

12. The adjustment system according to claim 3, wherein the connecting element comprises a coupling element and/or a latching fitting.

13. The adjustment system according to claim 1, wherein mounting of the first adjustment ring on the first bearing shell, mounting of the second adjustment ring on the second bearing shell, and/or mounting of the second adjustment ring on the first adjustment ring is carried out via a sliding bearing and/or a ball bearing.

14. A seat comprising an adjustment system according to claim 1.

* * * * *